Patented Oct. 2, 1934

1,975,339

UNITED STATES PATENT OFFICE 1,975,339

METHOD FOR IMPROVING PIGMENTS CONTAINING TITANIUM

Foord von Bichowsky, Glendale, Calif.

No Drawing. Application February 3, 1932, Serial No. 590,639

18 Claims. (Cl. 134—58)

The present invention relates especially to the overcoming of the harmful effect of iron oxide or the iron compounds that occur mainly as impurities in pigments containing titanium.

In white titanium pigments the presence of slight amounts of iron, usually in the form of oxide or oxides, is an objectionable impurity. It is stated that even so small a quantity as one tenth of one per cent of iron oxide gives to calcined titanium oxide a noticeable yellow color. Iron oxide has a similar discoloring effect, especially after calcining, upon the titanium composite pigments.

Many methods have been proposed for removing ferruginous impurities from various, calcined or uncalcined, titanium pigment materials. Some of the methods having the above purpose in view are: the treating of the titanium oxide containing substance with sulphur chloride, hydrochloric acid, chlorine, carbon monoxide, carbonyl chloride, hydrogen or hydrogen sulphide. These reagents being employed either separately or in various combinations.

The effect of iron compounds can also be overcome by converting them to the nearly white phosphate but this phosphate darkens under exposure to light.

Other investigators have proposed to improve titanium pigments by heating them to various temperatures either to convert the titanium oxide into a crypto-crystalline modification or else to alter the oil absorbing capacity of the pigment. But these methods operate under such conditions that the harmful effect of traces of iron compounds in the pigment is not satisfactorily overcome.

The method that I have discovered for overcoming the harmful effect of traces of iron in titanium oxide containing pigments and especially in titanium white pigments is technically easy to carry out. My method consists in heating the titanium containing material, usually only dried, to about 1100° C., for a relatively short time while in a reducing or neutral atmosphere or the treatment may take place in steps or stages in which different conditions as regards temperature, atmospheres, pressures or times may prevail. By my process the iron present is converted to, or held as, an oxide of lower valence, i. e. ferrous, and it can then enter into chemical combination with the titanium oxide of the pigment to form dark colored almost black mixed iron titanium oxides. One of these black oxides is represented in nature by ilmenite.

One value of my method lies in the fact that the presence of a limited amount of a black substance seems to increase the apparent brightness and covering power of a titanium pigment and for that reason small quantities of lampblack are often added to titanium whites. Obviously there is a practical limit to which a black body, for example ilmenite, can be present in a white titanium pigment and for that reason I prefer to use my process on titanium containing pigments relatively low in iron compounds. Such titanium oxide containing bodies may be obtained, in the well known way, by the hydrolysis of titanium sulphate solutions. These solutions may, if desired, be associated with substantial amounts of alkaline earth sulphates or other extender bodies and with varying amounts of iron salts in the ferrous state.

The finished dry product, so obtained, ought not to contain at the highest more than three (3) per cent of iron calculated as the metal. The dry product may, however, be of the composite pigment type and contain, for example, from fifty (50) to seventy-five (75) per cent of an insoluble sulphate of an alkaline earth metal or mixtures thereof.

In carrying out my process of causing the ferrous impurities of the titanium pigment to enter into chemical combination with the titanium oxide I may, for the purpose of converting the iron compound into iron titanate or titanates, use catalytic agents to facilitate the reaction. Of these agents gaseous hydrochloric acid or substances such as zinc chloride or aluminum chloride or other suitable halogen containing compounds may be employed. The formation of the ferrous oxide and the conversion of the ferrous oxide material and titanium oxide into iron titanates may be carried out under pressures greater than, equal to or less than atmospheric. Water vapor may under certain conditions be present.

As an example of the carrying out of my new process I give the following:—

One heats a dry titanium dioxide containing material, containing not more than three (3) per cent by weight of chemically combined iron, calculated as the metal, in a mixture of carbon monoxide and carbon dioxide gases to approximately 850° C., for about an hour or until the ferric oxide content of the so-treated material is reduced to substantially the ferrous state. When this state of reduction has been reached nitrogen or other neutral gas is run in to displace the reducing mixture of gases. This done, the material is then rapidly heated to about 1100° C., and held at that temperature for a short time. The resulting material which contains synthetic ilmenite, intimately associated with the other constituents, is allowed to cool rapidly in a neutral atmosphere.

Now having described my invention I claim:

1. Method for improving white pigments containing titanium and iron which consists in reducing their iron content substantially to the ferrous state, but without reducing their contained titanium oxide, and heating to cause this ferrous material to combine with the titanium oxide present to form black compounds.

2. Method for improving white pigments containing titanium and iron which consists in reducing only their iron content to the ferrous state, but without reducing their contained titanium oxide, and heating to cause the ferrous material to combine with the titanium oxide present to form black ferrous compounds.

3. Method for improving white pigments containing titanium and iron which consists in reducing their ferric iron content to a state of lower valency, but without reducing their contained titanium oxide, and heating to cause their ferrous iron content to combine with the titanium dioxide present to form black ferrous titanium compounds.

4. Method for improving white pigments containing titanium and iron which consists in reducing their iron content to the ferrous state, but without reducing their contained titanium oxide, and heating these ferrous iron compounds so as to cause them to combine with the titanium dioxide present to form black ferrous titanium compounds and then cooling the so obtained product so that these ferrous titanium compounds reach an unoxidized condition.

5. Method for improving white pigments containing titanium and iron which consists in reducing only their iron content to the ferrous state, but without reducing their contained titanium oxide, then heating these ferrous compounds so as to cause them to chemically combine with the titanium oxide to form ferrous titanates and cooling said ferrous titanates under non-oxidizing conditions until they have reached an unoxidized condition.

6. Method for improving white pigments containing titanium and iron which consists in heating them with a reducing material so as to reduce only their iron content to the ferrous state, but without reducing their contained titanium oxide, and continue the heating so as to cause the ferrous compounds to combine chemically with the titanium oxide present and then cooling, while keeping the iron compounds in a ferrous state, until a ferrous titanate is obtained.

7. Method for improving white pigments containing titanium and iron which consists in heating them under reducing conditions, but without acting upon their titanium oxide content, until their ferric content is reduced to the ferrous state and has chemically combined with the titanium dioxide present and then cooling the so obtained ferrous titanate containing material under non-oxidizing conditions.

8. Method for improving white pigments containing titanium and which contain less than three (3) per cent by weight of iron, calculated as the metal, which consists in reducing their iron containing material to ferrous oxide, but without reducing their contained titanium oxide, and heating this ferrous oxide so as to cause it to combine with an equivalent amount of titanium dioxide to form oxygen containing ferrous iron titanium compounds and cooling the so obtained material in a non-oxidizing atmosphere.

9. Method for improving white pigments containing titanium and which contain less than three (3) per cent by weight of iron, calculated as the metal, which consists in reducing the iron containing material to ferrous oxide, but without reducing their contained titanium oxide, and heating under non-oxidizing conditions so as to cause said ferrous oxide to combine with chemically equivalent amounts of titanium dioxide to form black oxygen containing compounds and cooling the product in a non-oxidizing atmosphere.

10. Method for improving white pigments containing titanium and which contain less than three (3) per cent by weight of iron, calculated as the metal, which consists in reducing the iron content to ferrous oxide, but without reducing their contained titanium oxide, and heating under non-oxidizing conditions so as to cause said ferrous oxide to combine chemically with an equivalent amount of titanium dioxide to form black ferrous titanate and cooling the so improved pigment in an indifferent atmosphere.

11. Method for improving white pigments containing titanium and which contain less than three (3) per cent by weight of iron, calculated as the metal, which consists in reducing the iron content to ferrous oxide, but without reducing their contained titanium oxide, by heating with a mixture of moist carbon dioxide and carbon monoxide, and while in the presence of aluminium chloride as a catalyst, to such temperatures and for such times as to cause the ferrous oxide, as formed, to combine chemically with the titanium oxide present to form ilmenite and then cooling the so treated material in an atmosphere free from oxidizing gases.

12. Method for improving white pigments containing titanium and which contain less than three (3) per cent by weight of iron, calculated as the metal, and which method consists in reducing the iron containing impurities to ferrous compounds, but without reducing the contained titanium dioxide, by heating in a mixture of carbon dioxide and carbon monoxide gases to about 850° C., for an hour and then raising the temperature rapidly to 1100° C., and holding thereat in an atmosphere of nitrogen for a short time until substantially all of the ferrous oxide present has combined with the titanium oxide to form black ferrous titanate and then cooling the so treated material in the nitrogen atmosphere.

13. As new compositions of matter the white calcined titanium oxide containing pigments of improved shade and brilliance that contain, chemically distributed therein, less than three (3) per cent by weight of iron in the form of ferrous oxide chemically combined with an equivalent amount of the titanium dioxide.

14. As new compositions of matter the white calcined titanium oxide containing pigments of improved shade and brilliance of the composite pigment type having, chemically distributed therein, less than three (3) per cent by weight of iron in the form of ferrous oxide chemically combined with an equivalent amount of the titanium dioxide in the form of ferrous titanates.

15. As a new composition of matter the white calcined titanium oxide containing pigment of improved shade and brilliance, of the composite pigment type, containing from fifty (50) to seventy five (75) per cent by weight of an insoluble sulphate of an alkaline earth material and containing, chemically distributed therein, less than three (3) per cent by weight of iron substantially in the form of ferrous oxide chemically combined with an equivalent amount of the titanium oxide.

16. As a new composition of matter the white calcined titanium oxide containing pigment of improved shade and brilliance, of the composite pigment type, containing from fifty (50) to seventy five (75) per cent by weight of a mixture of barium and calcium sulphates and containing, chemically distributed therein, less than three (3) per cent by weight of iron substantially in the form of ferrous oxide that is chemically combined with an equivalent amount of the titanium dioxide in the form of ferrous titanate.

17. As a new composition of matter the white calcined titanium oxide containing pigment of improved shade and brilliance and of a composite pigment type containing about sixty (60) per cent by weight of calcium sulphate and containing, chemically distributed therein, less than three (3) per cent by weight of iron substantially in the form of ferrous oxide that is chemically combined with an equivalent amount of the titanium dioxide in the form of synthetic ilmenite.

18. As a new composition of matter the white titanium oxide containing pigment of an improved shade and brilliance and of the composite pigment type, containing about sixty six (66) per cent by weight of barium sulphate and containing, chemically associated therewith, less than three (3) per cent of iron substantially in the form of ferrous oxide that is chemically combined with the equivalent amount of the titanium oxide in the form of synthetic ilmenite.

FOORD von BICHOWSKY.